HEAD POSITIONER FOR A MAGNETIC DATA STORAGE DEVICE

Filed Jan. 9, 1964 4 Sheets-Sheet 1

INVENTOR.
HOWARD L. DANIELS
BY
Carlson, Carlson & Sturm
ATTORNEYS

HEAD POSITIONER FOR A MAGNETIC DATA STORAGE DEVICE

Filed Jan. 9, 1964 4 Sheets-Sheet 2

INVENTOR.
HOWARD L. DANIELS
BY
Carlsen, Carlsen & Sturm
ATTORNEYS

HEAD POSITIONER FOR A MAGNETIC DATA STORAGE DEVICE

Filed Jan. 9, 1964 4 Sheets-Sheet 3

INVENTOR.
HOWARD L. DANIELS
BY
Carlsen, Carlsen & Sturm
ATTORNEYS

Nov. 14, 1967 H. L. DANIELS 3,353,167

HEAD POSITIONER FOR A MAGNETIC DATA STORAGE DEVICE

Filed Jan. 9, 1964 4 Sheets-Sheet 4

INVENTOR.
HOWARD L. DANIELS

BY

Carlsen, Carlsen & Sturm

ATTORNEYS 3,353,167
Patented Nov. 14, 1967

3,353,167
HEAD POSITIONER FOR A MAGNETIC DATA STORAGE DEVICE

Howard L. Daniels, West St. Paul, Minn., assignor, by mesne assignments, to Sperry Rand Corporation, New York, N.Y., a corporation of Delaware Filed Jan. 9, 1964, Ser. No. 336,804
8 Claims. (Cl. 340—174.1)

ABSTRACT OF THE DISCLOSURE

An apparatus for positioning a transducer at selectable positions over the surface of a magnetic recording medium is described. The system provides for increments of movement which are determined by adding the movements of various geared assemblies which are intermeshed in a binary series. Several double rack and pinion gear assemblies arranged in series for transmission of a fraction of the distance of lineal movement of any pinion to a rack in the next succeeding assembly are described. The last assembly is coupled to the transducer support.

In modern data processing, information is commonly stored upon the magnetizable surface of tape, drums, discs or other storage medium. The information data is stored in bits in spaced recording tracks formed along said surface. A recording head carrying a magnetic transducer is supported adjacent the surface for movement over the surface in a direction transverse with respect to the tracks for recording information on or retrieving it from any selected track. It is of great importance in this type of storage system that the recording head be moved rapidly and accurately between the various recording tracks and that it be stopped in any selected position with minimal deflection or bounce which might cause inaccurate readout or damaging contact of the recording head with the surface of the recording medium.

The present invention utilizes mechanical movements for effecting incremental positioning of a recording head and in its preferred form utilizes increments of movement interrelated in a binary series. In this respect the invention utilizes the teachings of United States Patent No. 2,862,389, issued Dec. 2, 1958 to Potter. The present invention, however, provides a substantial improvement over the various Potter disclosures, and the operational advantages thereover will readily be apparent.

The primary and general object of the invention is to provide an improved apparatus for positioning a recording head relative to any selected one of a plurality of recording tracks on a recording surface.

Another and more specific object of the invention is to provide an apparatus for moving a recording head between various positions along a rectilinear path over a magnetic recording surface with the increments of movement being determined by adding various geared stages which are intermeshed in a binary series whereby the number of positions is limited only by the number of stages used.

Still another object of the invention is to provide a positioner for moving a recording head between various positions along a rectilinear path over a magnetic recording surface having a plurality of parallel recording tracks, with said path extending transversely across the tracks, the positioner having controlled acceleration and stop means for effecting rapid and accurate head movement to a preselected position without transmitting deflection, recoil, bounce or vibration to the head itself.

With the above mentioned objects of the invention in view, the invention broadly comprises the arrangement of a plurality of double rack and pinion gear assemblies in series for transmission of a fraction of the distance of lineal movement of any pinion to a rack in the next succeeding assembly with the last pinion in the series having connection with a pickup head support for movement of the support along a rectilinear path, means for positively actuating one rack in each assembly for lineal movement thereof a predetermined distance, and said actuating means including a crank reciprocable between two positions at one side of a plane parallel to said path.

The above and still additional objects of the invention will be brought to light during the course of the following specification, reference being made to the accompanying drawings, in which FIG. 1 is a side elevation of the positioner in unactuated condition with the recording head in zero position relative to the information storage discs.

Figure 1:
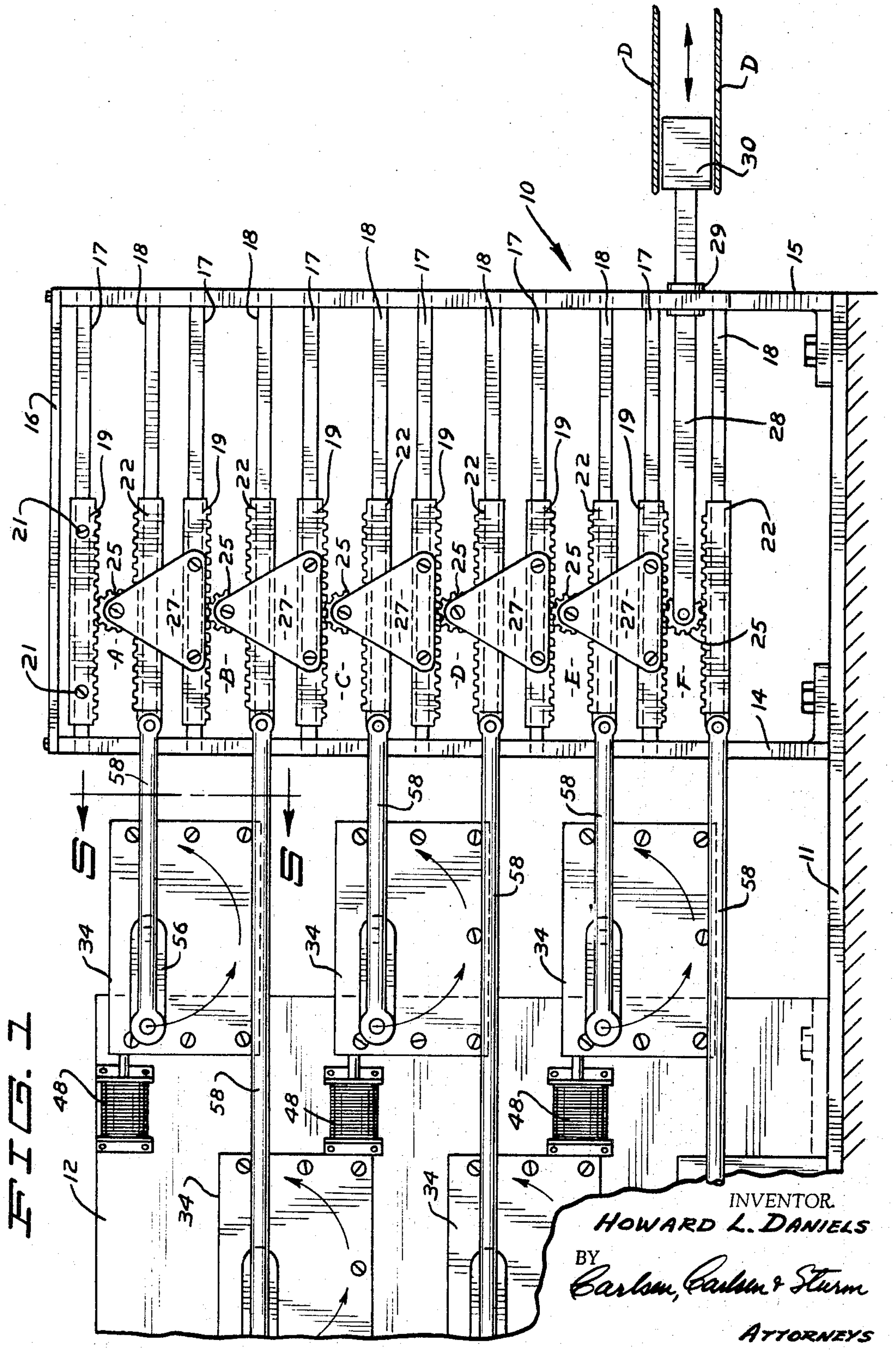

Referring more particularly to the drawings, reference characters will be used to denote like parts and structural features in the different views. The framework for the positioner is denoted generally by the numeral 10 and comprises an elongated base 11 having a mounting plate 12 supported in upright position on one end portion thereof and a pair of vertical slide rod supuorts 14 and 15 mounted in spaced position along the other end portion thereof. For the sake of convenience and clarity in describing the construction and operation of the positioner, the end on which support 15 is mounted will be referred to as the "front" or "forward" end and the opposite end as the "back" or "rearward" end. The supports 14 and 15 are parallel and may be interconnected at their upper ends for rigidity by the bar 16.

The supports are here shown as jointly carrying six sets of slide rods all of which are square in cross section. The upper and lower rods in each set are denoted respectively by the numerals 17 and 18. The ends of the rods 17 and 18 are integrally mounted in the supports 14 and 15 with all of the rods parallel and in vertical alignment.

Figures 2, 3:
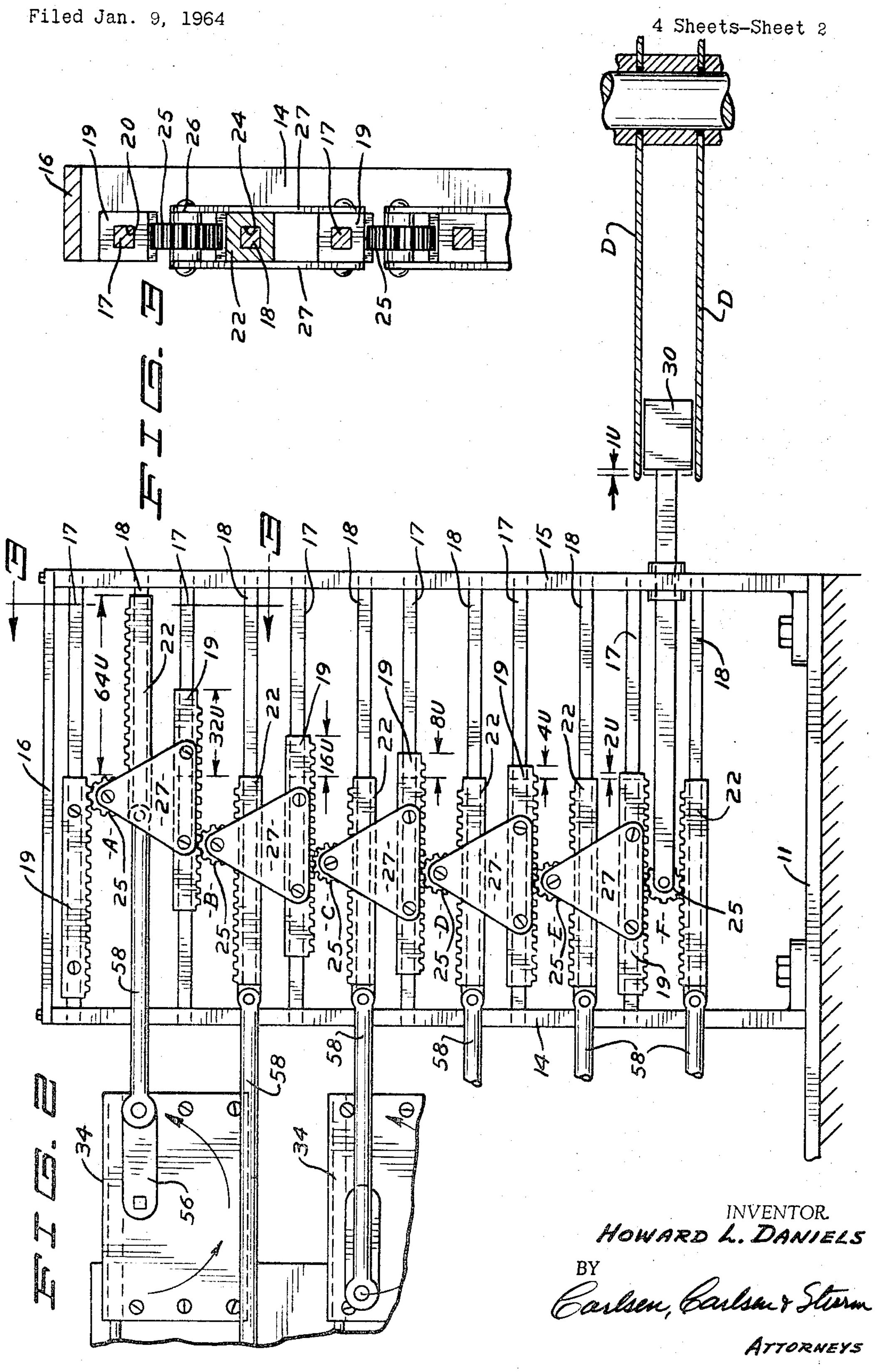
FIG. 2 is similar to FIG. 1 but shows the first stage only actuated so as to move the recording head inwardly one unit of distance, the movement of the first stage being transmitted to the head support in diminishing degrees through the lower or succeeding stages of the positioner.
FIG. 3 is an enlarged transverse vertical section through the upper portion of the positioner taken along line 3—3 of FIG. 2 and looking in the direction of the arrows.

A plurality of identical bottom toothed slides or racks 19 are slidably mounted one on each rod 17 for fore and aft sliding movement therealong. This is accomplished by providing a passage 20 (FIG. 3), which is square in cross section, longitudinally through the slide for reception of the bar. The uppermost rack 19 is fixed to the bar against sliding movement as by set screws 21.

A plurality of identical top toothed slides or driving racks 22 are slidably mounted one on each rod 18 for fore and aft sliding movement therealong. Racks 22 have longitudinal passages 24 (FIG. 3) which are square in cross section or receiving the rods 18. The toothed surfaces of racks 19 and 22 in each set accordingly vertically oppose each other.

A plurality of identical pinions 25 are disposed one between each set of racks 19 and 22 and in intermeshing engagement therewith. Each pinion 25, except the lowermost, is journaled for rotation on a pin 26 which is secured between the upper portions of transversely spaced plates 27, which extend downwardly on opposite sides of the driving rack 22 and are affixed as by screws to the rack 19 immediately therebelow. Accordingly, the assembly of each pinion 25, pin 26, set of side plates 27 and rack 19 forms a slidable carriage or transmitting rolling movement of the pinion along its associated rack to the pinion immediately therebelow. The lowermost pinion 25 is journaled at the rear end of a support arm 28 which extends forwardly through a slide bearing 29 mounted in support 15 and carries a recording head 30 at its forward end.

The construction of the recording head 30 forms no part of this invention. It will be understood that the head 30 may be of any conventional design for transferring data information to or retrieving it from a magnetic recording medium such as discs D, only the outer peripheral portions of which are here shown in cross section.

Each pinion 25 and its associated racks 19 and 22 forms a double rack and pinion gear assembly which assembly might be here referred to as a "stage" arranged in series with other stages. For convenience, these stages are identified from top to bottom in the series by the letters A, B, C, D, E, and F.

In a double rack and pinion gear arrangement, a pinion gear will advance longitudinally therebetween one half of the combined unidirectional movement of the racks. Accordingly, for example, if one rack should remain fixed and the other moved longitudinally 64 units of distance, the pinion will be moved linearly 32 units of distance. As a further example, should one rack be moved 64 units and the other rack moved 16 units in the same direction, the pinion therebetween would be moved linearly, one half of the combined total or 40 units.

Accordingly, with the described arrangement of the stages here in a binary series, it will be readily understood that one half of the distance of linear movement of any pinion will be transferred through the carriage of which it is a part to the next lower pinion in the series. This will be further understood by reference to FIG. 2 where only stage A has been actuated to move its driving rack 64 units of distance in a forward direction. This, then, is effective to forwardly move the respective pinions of stage A—32 units, B—16 units, C—8 units, D—4 units, E—2 units, and F—1 unit of distance to move the head 30 forwardly 1 unit.

Referring now to FIGS. 1 through 8, the means of actuating the driving racks 22 of the various stages will now be described. A plurality of actuator housings 34 are mounted on the plate 12, one to the rear of each of the various stages. Inasmuch as the housings and their associated mechanisms are identical only one will be described in detail.

A removable cover plate 35 is secured to one side of the housing as by screws 36. An elongated valve passageway 37 extends completely through the upper portion of the housing 34 in a fore and aft direction. Below the passageway 37 the housing is provided with a semicircular chamber 38 with the top wall 39 thereof being flat and parallel to passageway 37. Front and rear air ports, denoted respectively at 40 and 41, provide open communication between the passageway 37 and chamber 38.

A piston valve, denoted generally at 44, is slidably disposed in the passageway 37. This valve comprises an elongated stem 45 extending rearwardly behind the housing and having a pair of cylindrical air seals 46 and 47 mounted thereon at longitudinally spaced points within the passageway. In electric solenoid 48 is mounted on plate 12 to the rear of the housing 34 to axially receive the rear end portion of the valve stem 45, said stem portion being connected to or forming an armature within the solenoid. A spiral spring 49 within the core of the solenoid biases the valve 44 in a forward direction to the position shown in full lines in FIG. 6. When the solenoid is energized the valve is moved rearwardly against the compressive force of spring 49 so that seals 46 and 47 will be moved to the position shown in broken lines in FIG. 6. An air inlet port 50 leads from the exterior of housing 34 to the passageway 37 and is connected to a constant source of air pressure by coupling 51 and air line 52.

A shaft 54 is journaled in the housing side walls to extend transversely through chamber 38 with the shaft axis being just below the longitudinal center of wall 39. A flat imperforate air gate 55 is fixed to the shaft 54 to extend radially therefrom for flush engagement with the wall 39 to close either the port 40 or port 41 dependent upon the rotary position of shaft 54. One end of shaft 54 extends through the cover 35 and carries a crank arm 56 which extends radially from the shaft in the same direction and parallel to gate 55. The extended end of crank arm 56 is pivoted as by pin 57 to the rear end of an actuator link 58, the forward end of which is pivotally connected to the driving rack 22 as at 59. Inasmuch as the housings 34 are mounted on plate 12 in staggered relation for compactness, the links 58 are shown as being of different lengths, though this does not in any way affect the operation.

It will now be readily understood that the structure just described is a two position actuator for the driving rack 22 to which it is connected. The actuator is normally in the condition shown in FIG. 6 with air from the pressure source passing into the housing 34 through line 52, port 50, passageway 37 and port 40 into the chamber 38 to hold gate 55 in its rearward position under port 41. In this position crank arm 56 will, of course, also extend rearwardly and link 58 and its connected rack 22 will be in retracted positions as in FIG. 1. When in this condition the cylindrical seal 47 will prevent all but minute leakage of air from passageway 37 into port 41.

When solenoid 48 is energized by signal the piston valve 44 will be retracted opening the port 41 to the air inlet passage 50 with seal 46 closing communication between the passage 50 and port 40. With this movement of the valve, the diversion of air pressure will cause gate 41 to instantly rotate shaft 54 and crank arm 56 through 180 degrees until the gate contacts the front portion of wall 39. As this occurs, the driving rack 22 is moved to its advanced or forward position, such as in stage A in FIG. 2.

Upon de-energizing of solenoid 48, the spring 49 will return the valve 44 to its forward position and the air pressure, passing again through port 40, will cause gate 55 and arm 56 to swing back retracting link 58 and rack 52.

It will be now understood that the distance of movement of the head 30 can be controlled by simultaneously energizing various combinations of the solenoids to actuate the stages in the positioner necessary to provide the sum of units of movement to move the head the desired distance.

Due to the interrelation of the various stages in a binary series, each stage has an unalterable effect when actuated on the number of units moved by the head. The effect of each stage on head movement is as follows:

| Stage: | Units |
|---|---|
| A | 1 |
| B | 2 |
| C | 4 |
| D | 8 |
| E | 16 |
| F | 32 |

Accordingly, the head is moved the sum of the number of units of the stages actuated.

Figure 4:
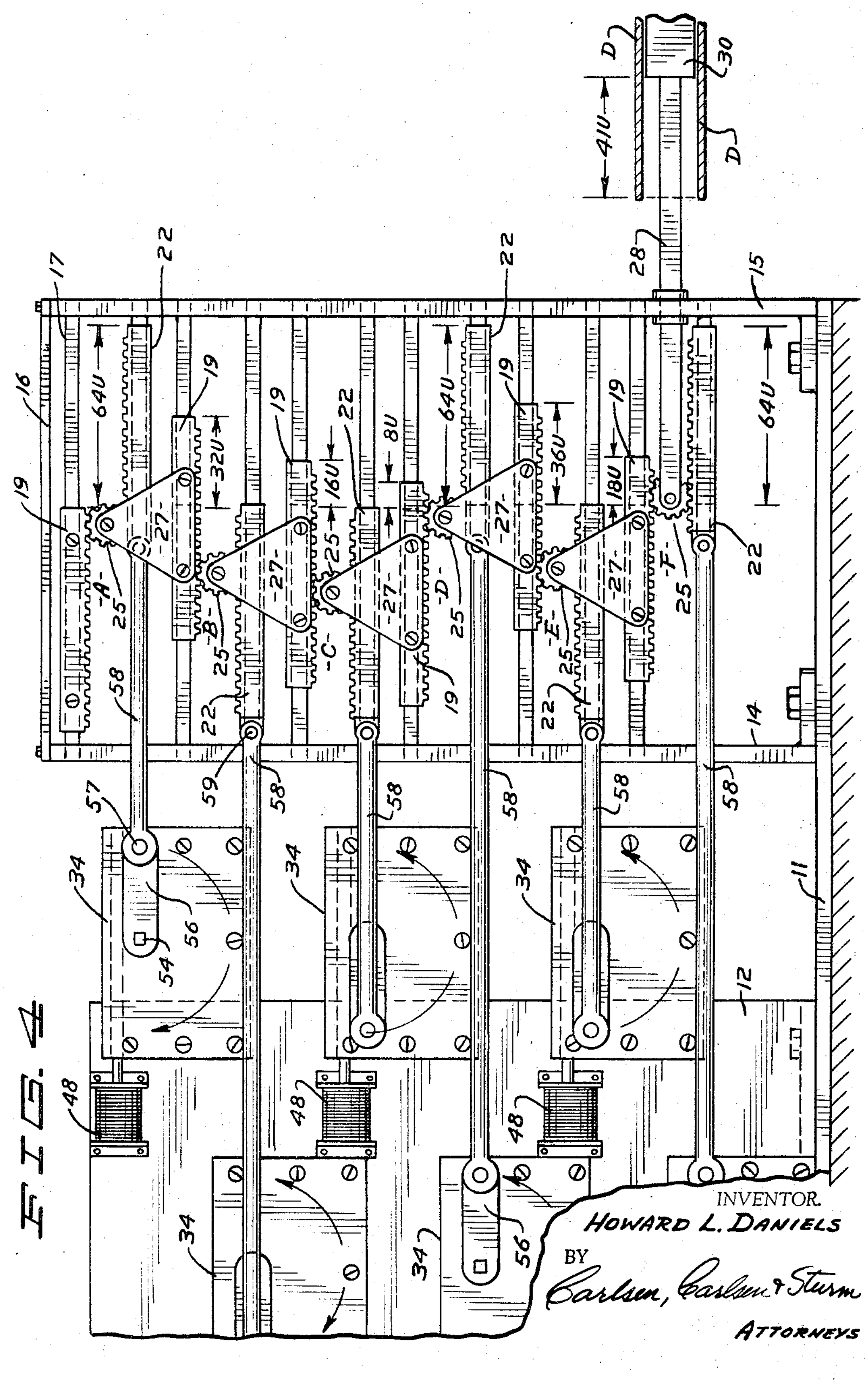
FIG. 4 is similar to FIGS. 1 and 2 but shows the first, fourth, and sixth stages actuated to move the recording head inwardly the sum of 1, 8 and 32 units or a total of 41 units distance along the recording surface.
Figures 5, 6, 7, 8:
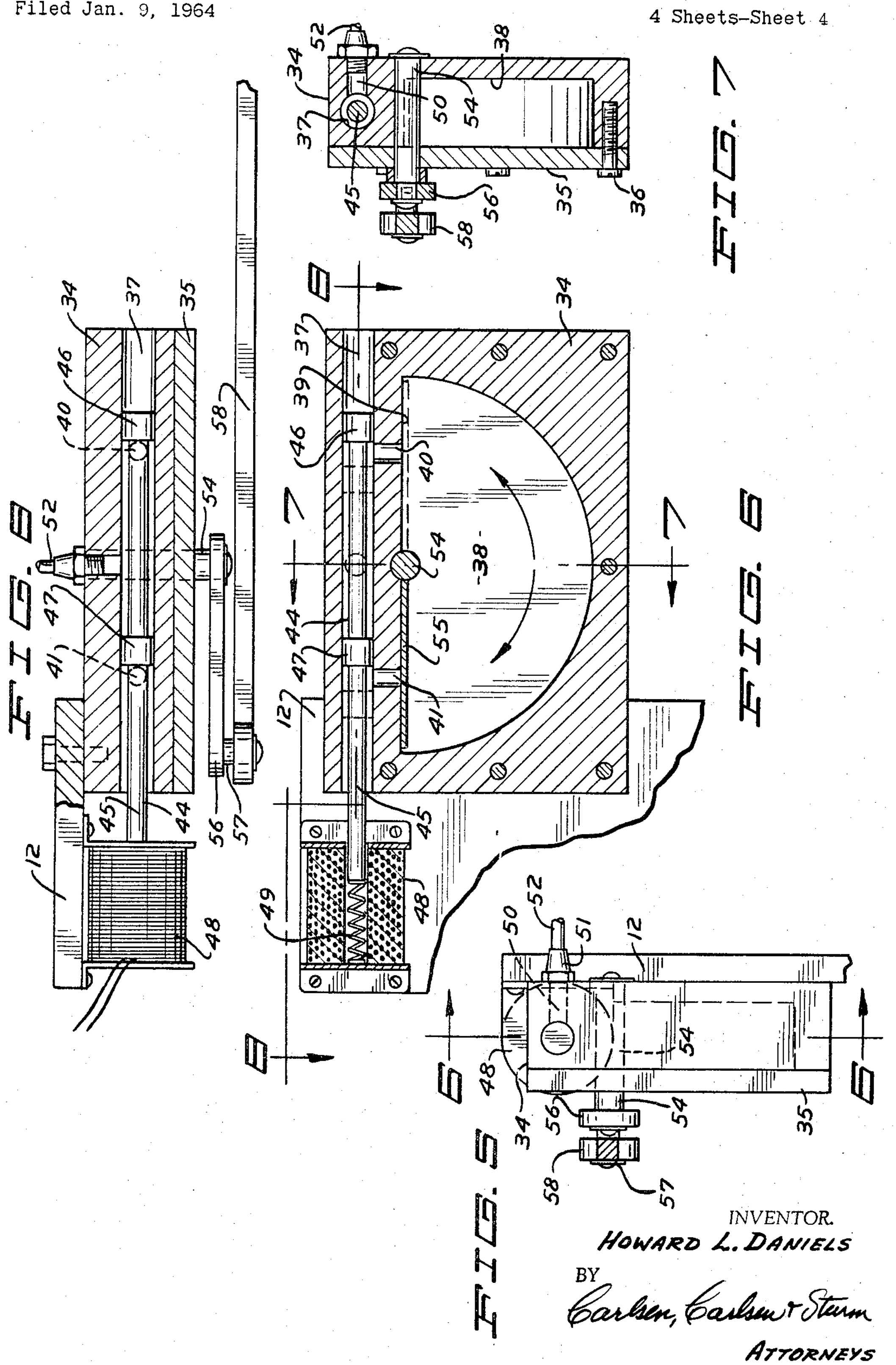
FIG. 5 is a transverse vertical section taken along line 5—5 of FIG. 1 showing the inner or front end of one actuator housing in elevation.
FIG. 6 is a longitudinal vertical section through the actuator housing taken on line 6—6 of FIG. 5 and showing the actuator valve in its normal or unactuated condition.
FIG. 7 is a transverse vertical section taken on line 7—7 of FIG. 6.
FIG. 8 is a horizontal section taken on line 8—8 of FIG. 6.

In the operative position shown in FIG. 4, stages A, D and F have been actuated. Accordingly, the head 30 has been moved 1+8+32 or a total of 41 units of distance. If all stages are actuated the movement will be 63 units where six stages are utilized as in the embodiment here described. Thus, the head can be moved to 63 different positions when six stages are used. Obviously, the number of positions will be double plus one with each added stage.

The effecting of the lineal movement of the driving racks and accordingly head 30 through a crank action of the type here described affords rapid and controlled acceleration and deceleration in the head movement. Of perhaps even greater significance is the fact that extremely accurate positioning of the head is assured as any bounce or recoil of the gate 55 at the point of impact is perpendicular to the direction of head movement and thus is not transferred in any significant degree to the head. It will also be understood that errors in any of the stages of their respective actuating mechanisms are progressively reduced by the successive powers of two as they are transmitted through the assemblies to the head support arm.

The positioner described accordingly economically and effectively carries out the aforementioned objectives. It is understood that suitable modifications may be made in the structure as disclosed, provided that they come within the spirit and scope of the appended claims.

Having now therefore fully illustrated and described my invention, what I claim to be new and desire to protect by Letters Patent is:

1. In a system for positioning a magnetic reproducer head at various preselected positions along a rectilinear path over a magnetic information storage surface, a head support, a plurality of independently movable linear movement determining devices, each of said devices including gear means intermeshing with gear means on the next adjacent device in accordance with the steps of a progressive series to add the respective movements of said devices, said gear means having a gear ratio for producing a transfer of a predetermined portion of movement of any one of said devices to the next succeeding device in the series, said head support being operatively connected to the last said device in the series for movement thereby along a rectilinear path, drive means additional to said devices for causing said series movement, said drive means for moving said devices singly or in any selected combination, and said drive means including actuators each movable about an axis generally perpendicular to said rectilinear path.

2. The subject matter of claim 1 wherein said drive means includes a plurality of said actuators operatively connected one to each of said devices, each of said actuators being a crank journaled for rotation on an axis perpendicular to said rectilinear path, and means on the drive means restricting movement of each crank to a 180 degree arc on one side of a plane parallel to the rectilinear path.

3. In a linear positioning system for a magnetic reproducer head in a data storage system, a frame, a plurality of linear movement determining devices mounted on the frame, including gear means having a gear ratio coupling said devices for producing movement in accordance with the steps of a binary series to add said movements, a support arm for carrying a magnetic reproducer head mounted on the frame for movement along a rectilinear path, means coupling the support arm to the devices to transmit the sum of said movements to the arm, a plurality of actuators one for each of said devices, each said actuator including a crank swingable through only 180 degrees at one side of a plane parallel to said path between rest and advanced positions, and a plurality of link means one connecting each actuator crank to its corresponding device.

4. In a positioning device for linearly moving a magnetic pickup head to different positions over a magnetic information storage surface, a frame, a plurality of linear motion carriages mounted on the frame for sliding movement along parallel paths, said carriages being progressively associated in series by intermeshing gears, said gears having a gear ratio for producing sliding movement of each carriage a predetermined fraction of the sliding movement of the next preceding carriage in the series whereby movement of any of said carriages will be transmitted in increasingly lesser degrees to all succeeding carriages in the series, a plurality of independent actuating means one for each of said carriages to effect sliding movement of the carriage a predetermined distance, a pickup head support operatively connected to the last carriage in the series for linear movement between various positions dependent upon the carriages moved by their respective actuating means.

5. The subject matter of claim 4 wherein each of said actuating means has only two linearly spaced rest positions, and said spacing between such rest positions being the same in all of said actuating means for uniform distance of sliding movement of each carriage by its actuating means.

6. In a positioner for moving a magnetic reproducer head between various positions along a rectilinear path, a frame, a plurality of double rack and pinion assemblies progressively mounted on the frame for movement along parallel paths, actuator means for driving one rack in each assembly along its path, the pinion in each assembly being journaled on the undriven rack in the next progressively adjacent assembly to connect the assemblies in series, each of said rack and pinion assemblies having a gear ratio for producing predetermined movement such that as one rack in an assembly is driven the linear movement thereof will be transferred through its engaged pinion at a 2 to 1 ratio to the next adjacent assembly in the series, and the pinion on the last assembly in the series being journaled on a support arm adapted to carry a magnetic reproducer head.

7. In a system for positioning a magnetic pickup head at various positions along a rectilinear path over a magnetic data storage surface, a frame, a plurality of linear movement determining devices movably mounted on the frame in a series, each of said devices including gear means intermeshing with gear means on the next adjacent device in accordance with the steps of a binary series to add the movements of the devices, a pickup head support member mounted on the frame for sliding movement along a rectilinear path and having operative connection with the endmost device in the series to be slidably moved a distance dependent upon the sum of movements of said devices, a plurality of pneumatic two-position actuators connected one to each of said devices for imparting predetermining movement to the device, and electric means for selective operation of the actuators.

8. A system as in claim 7 wherein each of said actuators includes housing means having a chamber therein and first and second ports in communication with said chamber; valve means in cooperative relation to said first and second ports and including a member actuated by said electric means, said member including a first portion for blocking said first port when said electric means is in a first operative state and a second portion for blocking said second port when said electric means is in a second operative state; crank means coupled to an associated one of said linear movement determining devices; means for coupling a source of fluid pressure to said valve means; and fluid gate means located in said chamber and coupled to said crank means for moving said crank means to a first position when said first port is blocked and to a second position when said second port is blocked, in response to said fluid pressure received at the unblocked one of said ports.

References Cited

UNITED STATES PATENTS 2,862,389 12/1958 Potter ------------ 340—174.1

OTHER REFERENCES

IBM Technical Disclosure, Bulletin vol. 1, No. 1, June 1958.

BERNARD KONICK, *Primary Examiner.*

R. SNIDER, *Assistant Examiner.*